United States Patent [19]

Kalpakci et al.

[11] Patent Number: 5,076,363

[45] Date of Patent: Dec. 31, 1991

[54] SURFACTANT-POLYMER COMPOSITION AND METHOD OF ENHANCED OIL RECOVERY

[75] Inventors: Bayram Kalpakci, Sagamore Hills; Teyhide G. Arf, Northfield, both of Ohio

[73] Assignee: The Standard Oil Company, Cleveland, Ohio

[21] Appl. No.: 667,195

[22] Filed: Mar. 11, 1991

Related U.S. Application Data

[63] Continuation of Ser. No. 419,581, Oct. 10, 1989, abandoned, which is a continuation-in-part of Ser. No. 304,348, Jan. 31, 1989, abandoned, which is a continuation of Ser. No. 927.731, Nov. 5, 1986, abandoned.

[51] Int. Cl.$^5$ .............................................. E21B 43/22
[52] U.S. Cl. ...................................... 166/273; 166/274; 166/275; 252/8.554
[58] Field of Search ........................ 166/273, 274, 275; 252/8.554

[56] References Cited

U.S. PATENT DOCUMENTS

| | | | |
|---|---|---|---|
| 3,373,810 | 3/1968 | Williams . | |
| 3,734,187 | 5/1973 | Norton et al. | 166/275 |
| 3,800,877 | 4/1974 | Knight | 166/273 X |
| 3,953,341 | 4/1976 | Martin | 252/8.554 |
| 4,004,638 | 1/1977 | Burdyn | 166/273 |
| 4,077,471 | 3/1978 | Shupe et al. | 166/275 |
| 4,110,229 | 8/1978 | Carlin et al. | 166/275 X |
| 4,137,969 | 2/1979 | Phalangas et al. | 166/275 X |
| 4,166,038 | 8/1979 | Stournas | 252/8.554 |
| 4,216,097 | 8/1980 | Stournas | 252/8.554 |
| 4,271,907 | 6/1981 | Gale | 166/274 |
| 4,277,351 | 7/1981 | Powers, Jr. et al. | 166/274 X |
| 4,293,428 | 10/1981 | Gale et al. | 166/275 X |
| 4,360,061 | 11/1982 | Canter et al. | 166/274 |
| 4,370,243 | 1/1983 | Chen et al. | 252/8.554 |
| 4,421,168 | 12/1983 | Hurd | 166/273 |
| 4,450,084 | 5/1984 | Adbo | 166/275 X |
| 4,457,372 | 7/1984 | Doster et al. | 166/274 |
| 4,463,806 | 8/1984 | Hurd | 166/273 X |
| 4,468,335 | 8/1984 | Chen et al. | 252/8.554 |
| 4,469,620 | 9/1984 | Kohn | 252/8.554 X |
| 4,479,894 | 10/1984 | Chen et al. | 252/8.554 |
| 4,502,540 | 3/1985 | Byham | 166/274 |
| 4,504,399 | 3/1985 | Stapp | 166/275 X |
| 4,515,701 | 5/1985 | Hoskin | 166/275 X |
| 4,517,101 | 5/1985 | Williams et al. | 252/8.554 |
| 4,554,974 | 11/1985 | Kalpakci et al. | 166/275 X |
| 4,555,351 | 11/1985 | Morita et al. | 166/275 X |
| 4,571,422 | 2/1986 | Symes et al. | 536/114 |
| 4,639,322 | 1/1987 | Beck et al. | 252/8.554 |
| 4,667,026 | 5/1987 | Jarry et al. | 536/114 |
| 4,667,740 | 5/1987 | Maddox, Jr. | 166/274 |
| 4,670,167 | 6/1987 | Bleeker et al. | 252/8.554 |
| 4,670,550 | 6/1987 | Bleeker et al. | 536/114 |
| 4,803,264 | 2/1989 | Krijnen et al. | 536/114 |
| 4,822,501 | 4/1989 | Debons et al. | 166/275 X |

FOREIGN PATENT DOCUMENTS

| | | |
|---|---|---|
| 1177636 | 11/1984 | Canada . |
| 1168847 | 6/1986 | Canada . |
| 0064384 | 11/1982 | European Pat. Off. . |
| 0206368 | 12/1986 | European Pat. Off. . |
| 0284366 | 9/1988 | European Pat. Off. . |
| 2156406 | 3/1984 | United Kingdom . |
| 2172008 | 2/1986 | United Kingdom . |
| 2160243 | 6/1986 | United Kingdom . |

OTHER PUBLICATIONS

Kuuskraa, V. A., "The Status and Potential of Enhanced Oil Recovery", SPE/DOE 14951, prepared for presentation at the SPE/DOE Fifth Symposium on EOR, Apr. 20-23, 1986.

Friedman, F., "Surfactant and Polymer Losses During Flow Through Porous Media", SPE Reservoir Eng. 1, 261-271 (1986).

Nagarajan, R., "Thermodynamics of Nonionic Polymer-Micelle Association", Colloids and Surfaces, 13, 1-17 (1985).

Prud'homme, R. K. et al., "Rheology Enhancement by Molecular Association Complexes", Society of Petroleum Engineers Journal, (Aug., 1984), pp. 431-434.

H. H. Ferrell et al., "Progress Report: Big Muddy Field Low-Tension Flood Demonstration Project With Emphasis on Injectivity and Mobility", SPE/DOE 12682, Presented at Fourth Symposium on EOR at Tulsa, OK., Apr. 15-18, 1984.

H. H. Ferrell et al., "Analysis of Low-Tension Pilot at Big Muddy Field, WY.", SPE/DOE 12683, Presented at Fourth Symposium on EOR at Tulsa, OK., Apr. 15-18, 1984.

(List continued on next page.)

Primary Examiner—George A. Suchfield
Attorney, Agent, or Firm—John E. Miller; Larry Evans

[57] ABSTRACT

The present invention provides for a composition comprising: (A) at least one compound represented by the formula

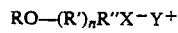

$$RO-(R')_nR''X^-Y^+$$

wherein: R is a hydrocarbyl group of from about 6 to about 24 carbon atoms; R' is ethoxy, propoxy or a mixture thereof; R'' is a divalent hydrocarbyl group of 1 to about 20 carbon atoms; X is a sulfate, sulfonate or carboxylate group; Y is a cation; and n is a number in the range of 1 to about 20; (B) at least one polymeric thickener; and (C) at least one aldehyde. The invention also relates to the foregoing compositions provided in the form of aqueous concentrates or the form of dry or substantially dry compositions, and to a method of making such concentrates or dry or substantially dry compositions. The invention also relates to an enhanced oil recovery process using the foregoing composition to provide a low-tension, viscous waterflood.

14 Claims, No Drawings

OTHER PUBLICATIONS

Cabane, B. et al., "Organization of Surfactant Micelles Adsorbed on a Polymer Molecule in Water: A Neutron Scattering Study", J. Physique 43 (1982) 1529–1542.

J. R. Bragg et al., "Loudon Surfactant Flood Pilot Test", SPE/DOE 10862, Presented at Third Symposium on EOR at Tulsa, OK., Apr. 4–7, 1982.

Nagarajan, R. et al., "Viscometric Investigation of Complexes Between Polyethylene Oxide and Surfactant Micelles", Presented at 183rd ACS National Meeting, Las Vegas, NV, Mar., 28–Apr. 2, 1982.

Uhl, J. T. et al., "Rheology of Solutions of Interacting Micelles and Polymer Chains", Chem. Eng. Commun. 16, 45–52 (1982).

Kalpakci, B., "Flow Properties of Surfactant Solutions in Porous Media and Polymer–Surfactant Interactions", Thesis Presented to Department of Chemical Engineering, Pennsylvania State University (Nov. 1981).

Kalpakci, B., et al., "Surfactant Binding to Polymer and Phase Separation in Aqueous Surfactant–Polymer Solutions", Paper Presented at the 90th National AIChE Meeting, Houston, TX, Apr. 5–9, 1981.

D. L. Taggart et al., "Sloss Micellar/Polymer Flood Post Test Evaluation Well", SPE/DOE 9781, Presented at Second Symposium on EOR at Tulsa, OK, Apr. 5–8, 1981.

S. P. Gupta, "Dispersive Mixing Effects on the Sloss Field Micellar System", SPE/DOE 9782, Presented at Second Symposium on EOR at Tulsa, OK, Apr. 5–8, 1981.

Desai, N. N., et al., "Physico-Chemical Aspects of Phase Separation in Mixed Surfactant–Polymer Systems", Paper Presented at New York Meeting, American Chemical Society, vol. 22, No. 2, pp. 39–40 (1981).

Qutubuddin, S. et al., "Proposed Mechanism of Polymer–Surfactant Interactions in Enhanced Oil Recovery", Polymer Preprints, 22 (2), pp. 41–46, (1981).

Nagarajan, R., "One the Nature of Interactions Between Polymers and Surfactants, in Dilute Aqueous Solutions", Presented at New York Meeting of ACS, vol. 22, No. 2, Aug. 1981, pp. 33–38.

Nagarajan, R. et al., "Surfactant–Polymer Interactions in Tertiary Oil Recovery", Paper Presented at the International Symposium on the Solution Behavior of Surfactants, Potsdam, New York, Jun. 1980.

S. P. Gupta, "Composition Effects on Displacement Mechanisms of the Micellar Fluid Injected in the Sloss Field Test", SPE 8827, Presented at First Symposium on EOR at Tulsa, OK, Apr. 20–23, 1980.

J. L. Wanosik et al., "Sloss Micellar Pilot: Project Design and Performance", SPE 7092, Presented at Tulsa, OK., Apr. 16–19, 1978.

P. B. Basan et al., "Important Geological Factors Affecting the Sloss Field Micellar Pilot Project", SP 7047, Presented at Tulsa, OK, Apr., 16–19, 1978.

Tsaur, K., "A Study of Polymer/Surfactant Interactions for Micellar/Polymer Flooding Applications", M. S. Thesis, The University of Texas at Austin, 1978.

Cabane, B., "Structure of Some Polymer–Detergent Aggregates in Water", J. of Physical Chemistry, 81, 1639–1645 (1977).

Shirahama, K. et al., "The Interaction Between Sodium Alkylsulfates and Polyethylene Oxide in 0.1 M NaCl Solutions", J. of Colloid and Interface Sci., 54, 450–452 (1976).

Smith, M. L. et al., "Fluorine Magnetic Resonance and Equilibrium Dialysis Study of the Binding of Sodium 12,12,12-Trifluorododecyl-Sulfate by Polyethyl Glycol", J. of Colloid and Interface Sci., 52, 507–515 (1975).

Fishman, M. L., et al., "Interactions of Aqueous (N-vinylpyrrolidone) with Sodium Dodecyl Sulfate. II. Correlation of Electric Conductivity and Viscosity Measurements with Equilibrium Dialysis Measurements", The J. of Physical Chemistry, 79, 2740–2744 (1975).

Tadros, T. F., "The Interaction of Cetyltrimethylammonium Bromide and Sodium Dodecylbenzene Sulfonate with Polyvinyl Alcohol. Adorption of the Polymer–Surfactant Complexes on Silica", J. of Colloid and Interface Sci., 46, 528–548 (1974).

Shirahama, K., "The Binding Equilibrium of Sodium Dodecyl Sulfate to Polyethylene Oxide in 0.1 M Sodium Chloride Solution at 30° C.", Colloid and Polymer Sci., 252, 978–981 (1974).

Schwuger, M. J., "Mechanism of Interaction Between Ionic Surfactants and Polyglycol Ethers in Water", J. of Colloid and Interface Sci., 43, 491–498 (1973).

Hill, H. J., et al., "Aqueous Surfactant Systems for Oil Recovery", J. Pet. Tech., pp. 186–194, (Feb. 1973).

French, M. S., et al., "Field Test of an Aqueous Surfactant System for Oil Recovery, Benton Field, IL.", J. Pet. Tech., pp. 195–204 (Feb. 1973).

Saito, S. et al., "Interactions of Anionic Surfactants with Nonionic Polymers, Comparison of Guanidinium, Tetraalkylammonium, and Alkali Metal Ions as Counterions", J. of Colloid and Interface Sci., 37, 154–164 (1971).

Arai, H. et al., "The Interaction Between Polymer and Surfactant: The Composition of the Complex Between Polyvinylpyrrolidone and Sodium Alkyl Sulfate as Revealed by Surface Tension, Dialysis, and Solubilization", J. of Colloid and Interface Sci., 37, 223–227 (1971).

Saito, S. et al., "Counterion Effect of Tetraalkylammonium and Long-Chain Alkylammonium Salts in the Interaction with Nonionic Polymers", J. of Colloid and Interface Sci., vol. 35, No. 2, pp. 346–353 (Feb. 1971).

Horin, S. et al., f"The Effect of Added Salt on the Interaction Between Polymer and Detergent in Aqueous Solution", J. of Colloid and Interface Sci., 32, 547–550 (1970).

Lewis, K. E., et al., "The Interaction of Sodium Dodecyl Sulfate with Methyl Cellulose and Polyvinyl Alcohol", J. of Colloid and Interface Sci., 32, 539–546 (1970).

Arai, H. et al., "Interaction Between Polymer and Detergent in Aqueous Solution", J. of Colloid and Interface Sci., 30 372–377 (1969).

Saito, S. "Solubilization Properties of Polymer–Surfactant Complexes", J. of Colloid and Interface Sce., 24, 227–234 (1967).

Jones, M. N., "The Interaction of Sodium Dodecyl Sulfate With Polyethylene Oxide", J. of Colloid and Interface Sci., 23 36–42 (1967).

Saito, S., "Binding of Surfactants by Polymers", J. Colloid and Interface Sci., 15, 283–286 (1960).

SURFACTANT-POLYMER COMPOSITION AND METHOD OF ENHANCED OIL RECOVERY

This is a continuation of copending application Ser. No. 07/419,581 filed on Oct. 10, 1989, now abandoned; which is a continuation-in-part of U.S. application Ser. No. 304,348, filed Jan. 31, 1989, which is a continuation of U.S. Ser. No. 927,731, filed Nov. 5, 1986. These prior applications are incorporated herein by reference in their entireties.

TECHNICAL FIELD OF THE INVENTION

This invention relates to surfactant-polymer compositions and to enhanced oil recovery methods using same. In one embodiment, dry or substantially dry compositions are provided which exhibit extended shelflifes and can be added at relatively low concentration levels to water to provide low-tension, viscous fluids for enhanced oil recovery processes.

BACKGROUND OF THE INVENTION

In the recovery of oil from oil-bearing reservoirs, it is usually possible to recover only minor portions of the original oil in place by the so-called primary recovery methods which utilize only the natural forces present in the reservoir. A variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected-water, and the wettability characteristics of the rock surfaces within the reservoir are factors which influence the amount of oil recovered by waterflooding. It has been proposed to add surfactants to the flood water in order to lower the oilwater interfacial tension and/or alter the wettability characteristics of the reservoir rock. Processes which involve the injection of aqueous surfactant solutions are commonly referred to as surfactant waterflooding or as low tension waterflooding, the latter term having reference to the mechanism involving the reduction of the oil-water interfacial tension. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Many waterflooding processes have employed anionic surfactants. One problem encountered in waterflooding with certain of the anionic surfactants such as the petroleum sulfonates is the lack of stability of these surfactants in so-called "hard water" environments. These surfactants tend to precipitate from solution in the presence of relatively low concentrations of divalent metal ions such as calcium and magnesium ions. For example, divalent metal ion concentrations of about 50–100 ppm and above usually tend to cause precipitation of the petroleum sulfonates.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use is generally not economically feasible for several reasons. Nonionic surfactants are not as effective on a per mole basis as are the more commonly used anionic surfactants and, additionally, the nonionic surfactants generally have a higher cost per unit weight than do the anionic surfactants. Nonionic surfactants usually exhibit a reverse solubility relationship with temperature and become insoluble at temperatures of above their cloud points making them ineffective in many oil formations. Nonionic surfactants that remain soluble at elevated temperatures are generally not effective in reducing interfacial tension. Moreover, nonionic surfactants usually hydrolyze at temperatures above about 75° C.

The use of certain combinations of anionic and nonionic surfactant to combat hard water formations has also been suggested. For example, U.S. Pat. No. 3,811,505 discloses the use of alkyl or alkylaryl sulfonates or phosphates and polyethoxylated alkyl phenols. U.S. Pat. No. 3,811,504 discloses the use of three component mixture including an alkyl or alkylaryl sulfonate, an alkyl polyethoxy sulfate and a polyethoxylated alkyl phenol. U.S. Pat. No. 3,811,507 discloses the use of a water-soluble salt of a linear alkyl or alkylaryl sulfonate and a polyethoxylated alkyl sulfate.

Cationic surfactants such as quaternary ammonium salts, and derivatives of fatty amines and polyamines, have also been used. However, these compounds have the disadvantage of substantivity or attraction, especially towards silicate rock, and they lose their activity by adsorption.

The use of certain amphoteric surfactants which function as cationics in acid media and become anionic when incorporated in alkaline systems has been suggested. For example, U.S. Pat. No. 3,939,911 discloses a surfactant waterflooding process employing a three-component surfactant system. This surfactant system includes an alkyl or alkylaryl sulfonate such as an ammonium dodecyl benzene sulfonate, a phosphate ester sulfonate, and a sulfonated betaine such as a $C_{12}$–$C_{24}$ alkylamido $C_1$–$C_5$ alkane dimethylammonium propane sulfonate.

The use of hydrocarbyl-substituted polyoxyalkylene sulfonates is disclosed, for example, in U.S. Pat. Nos. 3,916,994; 4,181,178; 4,231,427; 4,269,271; 4,270,607; 4,296,812; 4,307,782; 4,316,809; 4,485,873; and 4,478,281.

The use of thickening agents to increase the viscosity of injected water, normally to a value of at least equal, to that of the reservoir oil, in order to arrive at a favorable mobility ratio between the oil and water and increase the macroscopic displacement efficiency of waterflood is known. Examples of such thickeners or mobility control agents are polysaccharides such as xanthan gum, which are available from Kelco Company under the tradename "Kelzan", and partially hydrolyzed polyacrylamides available from the Dow Chemical Company under the tradename "Pusher".

U.S. Pat. No. 4,554,974 discloses an enhanced oil recovery method employing betaine amphoteric surfactants in combination with high molecular weight homopolysaccharide gum thickeners in a waterflood. The waterflood can be followed by a thickened buffer slug and then an aqueous flooding medium to displace the oil toward a production well.

A paper by W. R. Foster entitled "A Low-Tension Waterflooding Process", Journal of Petroleum Technology, Vol. 25, Feb. 1973, pp. 205-210, describes a technique involving the injection of an aqueous solution of petroleum sulfonates within designated equivalent weight ranges and under controlled conditions of salinity. The petroleum sulfonate slug is followed by a thickened water slug which contains a water-soluble biopolymer. This thickened water slug is then followed by a field brine driving fluid which is injected as necessary to carry the process to conclusion.

A number of tests employing polymeric thickeners in surfactant waterflooding have been reported in the literature. M. S. French et al and H. J. Hill et al report the use of 1.3% by weight petroleum sulfonate and 0.5% by weight sodium tripolyphosphate, and a partially hydrolyzed polyacrylamide polymer in a 9250 ppm TDS brine solution. M. S. French et al, "Field Test of an Aqueous Surfactant System for Oil Recovery, Benton Field, Ill.", J. Pet. Tech., February, 1973, pp. 195-204; and H.J. Hill et al, "Aqueous Surfactant Systems for Oil Recovery", J. Pet. Tech , February, 1973, pp. 186-194. H. H. Ferrell et al report pilot studies using 2.5% of a mixture of synthetic and petroleum sulfonates, 3% isobutyl alcohol and a biopolymer in a 1.0% NaCl brine solution. H. H. Ferrell et al, "Analysis of Low-Tension Pilot at Big Muddy Field, Wyo.", SPE/DOE 12683 (1984). H. H. Ferrell et al report field tests using 3.0% alkyl benzene sulfonate, 5% isobutyl alcohol and partially hydrolyzed polyacrylamide in about 6000 ppm TDS brine solution. H. H. Ferrell et al, "Progress Report: Big Muddy Field Low-Tension Flood Demonstration Project With Emphasis on Injectivity and Mobility", SPE/DOE 12682 (1984). J. R. Bragg et al report pilot studies using 2.3% of a hardness tolerant surfactant and a biopolymer in formation brine. J. R. Bragg et al, "Loudon Surfactant Flood Pilot Test", SPE/DOE 10862. D. L. Taggart et al report the use of 3.86% petroleum sulfonate, 1.25% isobutyl alcohol and partially hydrolyzed polyacrylamide in a 1.2% NaCl brine solution. D. L. Taggart et al, "Sloss Micellar/Polymer Flood Post Test Evaluation Well", SPE/DOE 9781 (1981). See also, S. P. Gupta, "Composition Effects on Displacement Mechanisms of the Micellar Fluid Injected in the Sloss Field Test", SPE 8827 (1980); S. P. Gupta, "Dispersive Mixing Effects on the Sloss Field Micellar System", SPE/DOE 9782 (1981); J. L. Wanosik et al, "Sloss Micellar Pilot: Project Design and Performance", SPE 7092 (1978); P. B. Basan et al, "Important Geological Factors Affecting the Sloss Field Micellar Pilot Project", SP 7047 (1978).

A disadvantage with most surfactant-polymer waterfloods is that chemicals are prepared off-site, and then shipped, generally long distances, to the site of use. The shipment of such large quantities of materials containing large volumes of water is both burdensome and expensive.

Furthermore, various problems may be encountered when attempting to create low tension, high viscosity fluids by on-site preparation methods. These problems include: the relatively high costs and difficulties associated with storing large quantities of several different additives (e.g., surfactants, polymeric thickeners, etc.); control problems associated with maintaining desired ratios of additives in the fluid to be injected; and the relatively short shelf life of additive mixtures that are currently available.

Stability of the viscosifying characteristics of polymer-thickening agents is not a new problem. U.S. Pat. No. 3,953,341 discloses a method of modifying acrylate polymers through a methylolation process which enhances stability for the polymers used in enhanced oil recovery techniques U.S. Pat. No. 4,517,101 discloses that biopolymers, particularly xanthan gum, may be modified by methylation of the polymer itself to reduce the biodegradability of the polymer in an enhanced oil recovery flooding process. Others have modified the polymer structure to alter various properties. U.S. Pat. No. 4,639,322, discloses the use of organic thiocyanates to enhance the filterability of biopolymer compositions particularly xanthan gum. U.S. Pat. No. 3,734,187 describes a method of sulfomethylation to alter the viscosity characteristics of polymers to be used in enhanced oil recovery, processes.

U.S. Pat. No. 4,667,026 discloses aqueous solutions of polysaccharide biopolymers (e.g., Xanthomonas/carbohydrate fermentation worts) being heat-treated for more than 5, but less than 60 minutes, at a pH ranging from 3.5 to 6.2, to improve the viscosifying, filterability and injectability properties thereof. The reference indicates that these solutions can be used for secondary and tertiary hydrocarbon (petroleum) recovery by waterflooding therewith.

While many surfactant waterflooding methods have been proposed, there is a substantial, unfulfilled need for a surfactant waterflooding method that is useful in recovering oil from subterranean formations wherein the surfactant(s) employed are utilized at sufficiently low concentration levels to render the method economically feasible. Aside from low concentration levels of surfactants for economic feasibility, it would be useful to provide a composition which includes the surfactants, thickening agents, and other ingredients necessary to formulate an effective waterflooding composition which can be packaged and shipped in the form of a concentrate containing a relatively small amount of water or in a dry or substantially dry state. This would require a concentrate or a dry or substantially dry composition that could be mixed on site with locally available water. Such a concentrate or composition would have to have a reasonable shelf-life and exhibit little or no viscosity or surface activity degradation over time.

SUMMARY OF THE INVENTION

The present invention provides for a composition comprising: (A) at least one compound represented by the formula

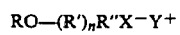

RO—(R')$_n$R"X⁻Y⁺ wherein: R is a hydrocarbyl group of from about 6 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20; (B) at least one polymeric thickener; and (C) at least one aldehyde. The invention also relates to providing the foregoing compositions in the form of concentrates or in dry or substantially dry forms, and to a method of making such concentrates or dry or substantially dry compositions. The invention also relates to an enhanced oil recovery process using the foregoing composition to provide a low-tension, viscous waterflood.

DESCRIPTION OF THE PREFERRED EMBODIMENTS

The term "hydrocarbyl", when used throughout this specification and in the appended claims, denotes hydrocarbon groups and groups having a predominantly hydrocarbon character within the context of the invention. Such hydrocarbyl groups include the following:

(1) Hydrocarbon groups, that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic materials, and the like.

(2) Substituted hydrocarbon groups, that is, groups containing non-hydrocarbon substituents which, in the context of this invention, do not alter the predominantly hydrocarbon character of the group. Those skilled in the art will be aware of suitable substituents; examples are:

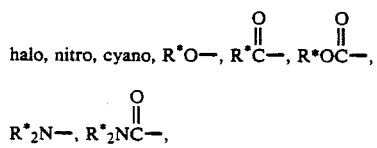

(3) Hetero groups, that is, groups which, while predominantly hydrocarbon in character within the context of this invention, contain atoms other than carbon present in a chain or ring otherwise composed of carbon atoms. Suitable hetero atoms will be apparent to those skilled in the art and include, for example, oxygen and nitrogen.

The surfactants (A) are represented by the formula

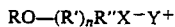

wherein R is a hydrocarbyl group of about 8 to about 24 carbon atoms, preferably about 8 to about 20 carbon atoms, more preferably about 12 to about 18 carbon atoms. R is preferably an alkyl, alkenyl, alkaryl or aryl group, more preferably an alkyl or an alkenyl group. R can be straight chained or branch chained. R' is ethoxy, propoxy or a mixture thereof. R" is a divalent hydrocarbyl group of 1 to about 20 carbon atoms, more preferably from 1 to about 10 carbon atoms, more preferably from about 2 to about 4 carbon atoms, more preferably about 2 to about 3 carbon atoms. R" can be an alkyl, alkenyl, alkaryl or aryl group. R" is preferably an alkyl group. X is a sulfate, sulfonate or carboxylate group. Y is a cation, preferably an alkali metal (preferably $Na^+$ or $K^+$), an alkaline earth metal (preferably $Ca^{++}$ or $Mg^{++}$) or, a nitrogen-containing group represented by the formula

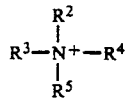

wherein $R^2$, $R^3$, $R^4$ and $R^5$ are independently hydrogen or methyl, preferably $R^2$, $R^3$, $R^4$ and $R^5$ are each hydrogen. n is a number in the range of 1 to about 20, more preferably in the range of about 1 to about 10, more preferably in the range of about 1 to about 6. It should be understood that these surfactants are typically not pure substances in the strict sense, but rather are mixtures of components distributed such that n is the resulting average value.

These surfactants can be prepared in a number of ways using known procedures. Suitable precursors include $C_{10-24}$ linear or branched-chain alcohols. Preferably the linear or branched-chained alcohol contains from about 10 to about 20 carbon atoms, more preferably about 12 to about 18 carbon atoms. If R' is ethoxy, the alcohol is reacted with ethylene oxide to yield a hydrocarbyl oxyethylene ether. The average number of ethylene oxide units can vary from 1 to about 20, more preferably from 1 to about 10, more preferably from 1 to about 6. If R' is propoxy, the alcohol is reacted with propylene oxide to yield a hydrocarbyloxypropylene ether. The average number of propylene oxide units can also vary from 1 to about 20, more preferably from 1 to about 10, more preferably from 1 to about 6.

If R' is a mixture of ethoxy and propoxy groups, the alcohol is reacted initially with either ethylene oxide or propylene oxide, and then the resulting intermediate product is reacted with the other. The sequence of reaction of the alcohol with ethylene oxide or propylene oxide is dependent upon the desired structure of the surfactant. For example, if it is desired to have ethylene oxide attached to the RO group, the alcohol is initially reacted with ethylene oxide and then the resulting intermediate product is reacted with propylene oxide. On the other hand, if it is desired to have propylene oxide attached to the RO group, the alcohol is initially reacted with propylene oxide and then the resulting intermediate product is reacted with ethylene oxide. Any combination of ethoxy and propoxy groups in the surfactants of the invention is useful. Preferably the total number of ethoxy and propoxy groups ranges from 1 to about 20, more preferably from 1 to about 10, more preferably from 2 to about 6.

Methods of alkoxylation are well known to those skilled in the art. The alkoxylation reaction can be achieved using a strong base or Lewis acid catalyst such as NaOH, KOH, $BF_3$ or $SnC_{12}$. Examples of other suitable bases include sodium phenolate and alkali metal alkoxides such as sodium methoxide or propoxide. Other suitable acids include $BF_3$-etherate, p-toluene sulfonic acid, fluorosulfonic acid, aluminum butyrate and perchloric acid.

This invention applies to both sulfated and sulfonated surfactants. When the surfactant is a sulfate, X is $OSO_3^-$; when the surfactant is a sulfonate, X is $SO_3^-$. Sulfates and sulfonates are made somewhat differently but they behave similarly in this invention. Alkoxylated surfactants that are sulfates can be prepared in a number of ways well known to those skilled in the art. The techniques of sulfonation which may be used to prepare such surfactants are discussed in the U.S. Pat. No. 4,203,428, which is incorporated herein by reference. Alkoxylated surfactants that are sulfonates can also be prepared in a number of ways. For example, they may be prepared in the same way as alkoxylated sulfates with sulfonation substituted for the sulfation step, as described in U.S. Pat. No. 4,293,428, which is incorporated herein by reference. The sulfated or sulfonated material can then be neutralized using, for example, an alkali metal, alkaline earth metal or ammonium to form the sulfated or sulfonated surfactant.

A carboxylate group may be incorporated into the alkoxylated material by any number of well-known methods. For example, the alkoxylated material may be reacted with a halogen carboxylic acid to result in a carboxylic acid. Alternatively, the alcoholic end group —$CH_2OH$ can simply be oxidized under well known conditions to yield a carboxylic acid. The resulting product is then neutralized using, for example, an alkali metal alkaline earth metal or ammonium to form the carboxylate surfactant.

In one embodiment of the invention, the surfactant (A) is a compound represented by the formulae

or

wherein $R^1$ is an alkyl or an alkenyl group of preferably about 10 to about 20 carbon atoms, A is a cation, a and b are independently numbers in the range of zero to about 6 with the proviso that a and b cannot both be zero, and z is preferably the valence of A. Mixtures of these compounds can be used. $R^1$ is preferably an alkyl or an alkenyl group of about 12 to about 18 carbon atoms, a is preferably from about 2 to about 4, and b is preferably from about 2 to about 4. $R^1$ can be a straight chain or branched chain group. A is preferably an alkali metal (e.g., $Na^+$, $K^+$), alkaline earth metal (e.g., $Ca^{++}$, $Mg^{++}$) or ammonium ($NH_4^+$) ion.

In another embodiment, the surfactant (A) is a compound represented by the formula

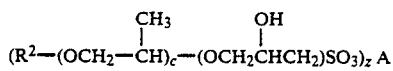

wherein $R^2$ is a hydrocarbyl group of preferably about 6 to about 24 carbon atoms, more preferably about 12 to about 18 carbon atoms; c is a number preferably in the range of 1 to about 10, more preferably from about 2 to about 6; A is a cation, preferably an alkali metal (e.g., $Na^+$, $K^+$), alkaline earth metal (e.g., $Ca^{++}$, $Mg^{++}$) or an ammonium ion; and z is preferably the valence of A. $R^2$ is preferably an alkyl or an alkenyl group. $R^2$ can be a straight chain group or a branched chain group.

The surfactants (A) of the invention are preferably present in the aqueous compositions used in accordance with the inventive enhanced oil recovery method at a level in the range of about 0.1% to about 1.2% by weight, more preferably from about 0.1% to about 1% by weight, more preferably from about 0.1% to about 0.7% by weight, more preferably from about 0.1% to about 0.6%, and more preferably from about 0.15% to about 0.5% by weight of said aqueous composition.

These surfactants have a high tolerance to high levels of aqueous phase salinity (e.g., total dissolved salts (TDS) concentrations or values of up to about 70,000 ppm) as well as high levels of divalent metal ions such as calcium, magnesium, and the like (e.g., up to about 10,000 ppm). Accordingly, the water employed in the inventive method can be a high salinity brine Such as Sea Water.

The polymeric thickeners (B) can be any thickening agent that is stable under the anticipated operating conditions. These thickeners are preferably employed in the aqueous compositions used in the inventive enhanced oil recovery process at a level in the range of from about 0.02% to about 0.3% by weight, more preferably from about 0.05% to about 0.15% by weight. A preferred class of polymers includes polysaccharides such as those available commercially which are produced by fermentation of carbohydrates by bacteria of the genus Xanthomonas. Examples of such polysaccharides are those produced by action of *Xanthomonas Campestris, Xanthomonas Begonia, Xanthomonas Phaseoli, Xanthomonas Hederae, Xanthomonas Incanae, Xanthomonas Carotae,* and *Xanthomonas Translucens.* Preferred species are xanthan gums which are commercially available from Pfizer under the tradenames "Flocon 4800", "Flocon 4800 M" and "Flocon 4800 MT". Another preferred species is a polysaccharide which is available under the tradenames "Kelzan" and "Biozan" from Kelco Company. Production of useful polysaccharides is described in Smiley, K. L. "Microbia Polysaccharide-A Review", Food Technology 29,9:112-116 (1966) and in Moraine, R. A., Rogovin, S. P., and Smiley, K. L. "Kinetics of Polysaccharide B-1459 Synthesis", J. Fermentation Technology, 44, pp. 311-132 (1966), which are incorporated herein by reference.

A class of thickeners that is particularly useful includes the homopolysaccharide gum thickeners represented by the formula:

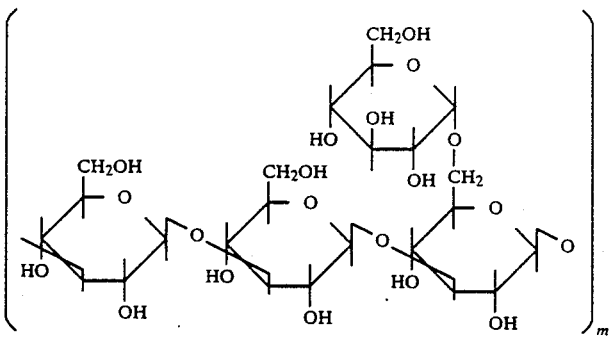

wherein m is a number that is high enough to provide the desired molecular weight. These thickeners are typically nonionic and have a molecular weight that is greater than about one million, preferably in the range of about 1 to about 3.5 million. The polymer structure is preferably a linear chain of anhydroglucose units linked beta (1-3). In one embodiment about 30% to about 35% of the linear chain units bear single appended anhydroglucose units linked beta (1-6). This thickener can be cellfree and produced by selected fungus strains of the genus Schlerotium in a pure culture fermentation. An example of a commercially available thickener of this type is Actigum CS-11, a product of Jetco Chemicals identified as scleroglucan.

Another preferred class of polymeric thickeners includes the commercially available, water-soluble high molecular weight, unhydrolyzed or partially hydrolyzed polyacrylamides having molecular weights in the range of above about $0.2 \times 10^6$, preferably from about $0.5 \times 10^6$ to about $40 \times 10^6$, more preferably from about $3 \times 10^6$ to about $10 \times 10^6$. Copolymers of acrylamide and acrylic acid within the same molecular weight range, may also be used. If t he polymer employed is a partially hydrolyzed polyacrylamide, up to about 70% and preferably from about 12% to about 45% of the carboxylamide groups are hydrolyzed to carboxyl groups. A number of partially hydrolyzed polyacrylamides and-/or co-polymers of acrylamide and acrylic acid are available commercially and commonly employed in enhanced oil recovery. These include, for example, materials marketed by the Dow Chemical Company under the trade name "Pusher" and by American Cyanamid under the tradename "Cyanatrol".

Naturally occurring polymers may also be employed as the polymeric thickeners. Examples include Guar gum, Locust Bean Gum, natural starches and derivatives thereof, cellulose and its derivatives including hydroxy ethyl cellulose.

The aldehyde (C) is preferably a compound represented by the formula

wherein $R^3$ is a hydrocarbyl group of preferably 1 to about 20 carbon atoms, more preferably 1 to about 10 carbon atoms, more preferably 1 to about 6 carbon atoms. $R^3$ can be an aliphatic, alicyclic, aromatic, aliphatic- or alicyclic-substituted aromatic or aromatic-substituted aliphatic group. $R^3$ can be a straight chain or branched chain, saturated or unsaturated group. Examples include formaldehyde, acetaldehyde, propionaldehyde, n-butyraldehyde, benzaldehyde, p-nitrobenzaldehyde, o-tolualdehyde, m-tolualdehyde, p-tolualdehyde, salicylaldehyde, phenylacetaldehyde, alpha-methylvaleraldehyde, beta-methylvaleraldehyde, caproaldehyde, isocaproaldehyde, heptaldehyde, p-hydroxybenzaldehyde, vanillin, piperonal, or a mixture of two or more thereof. Formaldehyde is preferred. The aldehyde (C) is preferably present in the aqueous compositions used in the inventive enhanced oil recovery process at a concentration in the range of from about 0.005% to about 1% by weight, more preferably about 0.01% to about 0.1% by weight.

While not wishing to be bound by theory, it is believed that incorporation of the aldehyde (C) into the inventive concentrates or dry or substantially dry compositions extends the shelf-life of such concentrates or dry or substantially dry compositions and prevents or reduces degradation of the polymeric thickener (B).

In one embodiment of the invention, a co-surfactant (D) is used. This co-surfactant can be represented by the formula

wherein R* is a hydrocarbyl group of preferably from about 10 to about 28 carbon atoms, more preferably from about 16 to about 22 carbon atoms. R* is preferably an alkyl or an alkenyl group, and internal olefins are useful. D is a sulfate, sulfonate or carboxylate group. E is a cation, preferably an alkali metal (e.g., $Na^+$, $K^+$) alkaline earth metal (e.g., $Ca^{++}$, $Mg^{++}$), or an ammonium ion. An example of a commercially available material that is useful is Enordet IOS 1720 (a product of Shell identified as a sulfonated $C_{17-20}$ internal olefin sodium salt). The concentration of this cosurfactant in the inventive aqueous compositions used in the inventive enhanced oil recovery process is preferably in the range of up to about 1% by weight, more preferably up to about 0.5% by weight, more preferably from about 0.05% to about 0.5%, more preferably from about 0.05% to about 0.3% by weight.

The weight ratio of component (A) to component (B) is preferably from about 0.1:1 to about 60:1, (that is, from about 0.1 part (A) per part of (B) to about 60 parts of (A) per part of (B)), more preferably about 0.5:1 to about 20:1, more preferably about 1:1 to about 10:1. The weight ratio of component (A) to component (C) is preferably about 0.05:1 to about 250:1, more preferably 0.5:1 to about 150:1, more preferably about 1:1 to about 100:1, more preferably about 1.5:1 to about 50:1. The weight ratio of component (A) to component (D), when component (D) is present, is preferably in the range of bout 0.05:1 to about 1000:1, more preferably about 0.1:1 to about 100:1, more preferably about 0.5:1 to about 10:1.

The inventive compositions are preferably made by first mixing the polymer (B) with surfactant(s) (A) and optionally (D) at the desired ratio, then adding a suitable amount of aldehyde (C). These components can be provided in dry form, or they can be provided in the form of aqueous solutions or dispersions. If one or more of the individual components are provided in dry form, or if, the amount of water provided with such components is insufficient for the desired aqueous composition when mixed with the rest of the components, additional water (e.g., distilled water, deionized water, tap water, or seawater) is added. The level of water can be sufficient to provide the desired concentrations of components (A), (B), (C) and optionally (D) for use in accordance with the inventive enhanced oil recovery process.

In one embodiment of the invention, the inventive composition containing components (A), (B), (C) and, optionally (D), can be provided in the form of dry or substantially dry composition. The term "substantially dry" composition refers to a composition having a water content of up to about 20% by weight, more preferably up to about 15% by weight, more preferably up to about 10% by weight, more preferably up to about 5% by weight. In this embodiment, an aqueous composition is initially prepared preferably by first mixing the polymer (B) with surfactants (A) and optionally (D) at the desired ratio, then adding a suitable amount of the aldehyde (C). If the individual components are provided in dry form, or if the amount of water provided with such components is insufficient for the desired aqueous composition, additional water is added. While there are no upper limits on the concentrations of components (A), (B), (C) and optionally (D) in these aqueous compositions, practical limits will be readily apparent to the skilled art worker due to the relatively high viscosities of the mixtures and the resulting handling (e.g., pumping) considerations. The combined concentration of components (A), (B), (C) and optionally (D) in these aqueous compositions, is preferably from about 20 to about 500 grams per liter, more preferably about 70 to about 350 grams per liter. Part of the water in these aqueous compositions can be replaced by one or more alcohols (e.g., $C_1$ to $C_5$ alcohols) and/or one or more organic solvents (e.g., toluene) to reduce the boiling point of the aqueous composition to facilitate drying when it is desired to use a dry or substantially dry composition as discussed below. The pH of the resulting aqueous composition is preferably adjusted to a level sufficient to prevent hydrolyzing of the polymeric thickener; this pH is preferably in the range of about 6 to about 7. The mixing temperature is preferably in the range of about 10° C. to about 100° C., more preferably about 20° C. to about 80° C. Deliquification may be accomplished by any suitable means such as spray-drying, freeze-drying, etc. If spray-drying is used, an air or nitrogen atmosphere is useful and the temperature should be maintained below the temperature at which the surfactant(s) and polymer(s) start to degrade. The dry or substantially dry composition is suitable for extended storage (e.g., up to about 2000 days, preferably from about 60 to about 1000 days), transportation, dispersion in water, and used in accordance with the inventive enhanced oil recovery process. The dry or substantially dry composition can be dispersed or dissolved in water without using additional dispersion or dissolution aids. Dispersion or dissolution can be effected using conventional conveyors (e.g., screw feeders, venturi, etc.) and conventional mixers (e.g., mechanically agitated vessels, orifice mixers, nozzle mixers, valve mixers, conical mixers, etc.)

The invention also provides for aqueous concentrates containing components (A), (B), (C) and, optionally (D). Components (A), (B), (C) and (D) are provided in such concentrates at the ratios indicated above. These concentrates preferably contain from about 0.5% to about 60% by weight water, more preferably about 1% to about 20% by weight water. These concentrates can be made by deliquifying aqueous compositions containing components (A), (B), (C) and, optionally (D), as discussed above, using the same procedures used for preparing the inventive dry or substantially dry compositions with the exception that water is removed until the desired concentration of water is achieved rather than removing all or substantially all of such water. Alternatively, the inventive dry or substantially dry compositions Can be reconstituted with sufficient water using conventional techniques to provide the desired concentration of water. These concentrates are suitable for extended storage periods (e.g., up to about 2000 days, preferably from about 60 to about 1000 days), transportation, dilution in water, and use in accordance with the inventive enhanced oil recovery process. These concentrates can be diluted using blending techniques known in the art.

The inventive enhanced oil recovery method may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716 which is incorporated herein by reference. Other well arrangements may be used in carrying out the present invention, examples of some of which are also disclosed in the foregoing '716 patent.

The term "pore volume" is used herein to mean that volume of the portion of the formation underlying the well pattern employed, as described in greater detail in the '716 patent.

The aqueous composition containing components (A), (B) and (C) and, optionally (D), that is injected in accordance with the inventive enhanced oil recovery method can be prepared on-site using the blending procedures discussed above. Alternatively, this aqueous composition can be prepared using the inventive concentrate or the inventive dry or substantially dry composition, and conventional dispersion or dilution procedures. This aqueous composition can be referred to as a surfactant slug.

In a typical operation, the surfactant slug is injected into the formation through one or more injection wells using standard techniques known in the art, then, depending on the design of the process, a buffer slug may be injected, and finally an aqueous flooding medium is injected after the surfactant slug (or if a buffer slug is used after the buffer slug) to drive the oil toward one or more production wells. The buffer slug contains an effective amount of a thickener to increase the viscosity of the buffer slug to the same level or a level above that of the surfactant slug, and thereby provide stable propagation of the mobilized oil toward the production wells. The thickener employed in the buffer slug can be the same or different than component (B), but is preferably the same.

The size of the surfactant slug preferably ranges from about 0.2 to about 3 pore volumes. The size of the buffer slug is preferably in the range of up to about 3 pore volumes.

The drive fluid or aqueous flooding medium is injected into the reservoir in sequential order after the surfactant slug, or if a buffer slug is used after the buffer slug. This flooding medium is preferably water and can be any source of water, such as sea water, that is readily available.

An advantage of the method of the present invention is that it can be practiced in subterranean formations having temperatures ranging from about 15° C. to about 105° C. and above, high pressures (e.g., up to about 4000 psi), and the flood water can have a high salinity (e.g., TDS values as high as about 70,000 ppm such as when the floodwater is sea water), and high concentrations of divalent metal ions (e.g., up to 10,000 ppm). These conditions are often encountered at Prudhoe Bay, the North Sea, the Persian Gulf, the Gulf of Mexico, as well as other major oil fields.

The following Examples 1–10 are provided for the purpose of further illustrating the present invention. Example C-1 is provided for comparative purposes. Unless otherwise indicated, in the following examples as well as throughout the specification and in the claims, all parts and percentages are by weight, all temperatures are in degrees centigrade, and all pressures are atmospheric.

The seawater that is used in the following examples has about 30,000 ppm TDS level and contains the following major cations:

| Cation | ppm |
|--------|-----|
| $Na^+$ | 9200–9300 |
| $Mg^{++}$ | 1080–1100 |
| $Ca^{++}$ | 330–340 |
| $K^+$ | 330–350 |
| $Sr^{++}$ | 5–10 |

The interfacial tension (IFT) measurements and solubilization parameters reported in the following examples are determined using the following procedures. An aqueous phase and an oil phase are first pre-equilibrated by mixing one part by volume of the oil phase with one part by volume of the aqueous phase. The aqueous phase consists of the aqueous compositions identified in the following examples. Stock tank oil is used for the oil phase. The oil phase and aqueous phase are brought to thermal equilibrium at 93.3° C. The mixture is then shaken by hand for about 30 seconds and allowed to equilibrate until there is no change in the volume of each phase.

Solubilization parameters are determined by measuring the final volumes of each phase at 93.3° C. The oil solubilization parameter (Vo/Vs) is the volume of oil solubilized in the microemulsion divided by the volume of surfactant in the total system. The water solubilization parameter (Vw/Vs) is the volume of water solubilized in the microemulsion divided by the volume of surfactant in the total system.

IFT values for these systems are determined at 80° C. using a spinning drop interfacial tensiometer. These IFT values are determined in the following way: the interfacial tension of a system is measured as a function of time, usually for 2 hours. If the values for the last 20 minutes agree to within 1–2%, the 2-hour measurement is reported; if not, the measurements are continued until the 1–2% agreement for a 20-minute period is obtained.

EXAMPLE 1

An aqueous system is prepared by mixing the following materials at the indicated concentrations with seawater: 0.21% by weight Shell Enordet IOS-1720 (product of Shell identified as sulfonated $C_{17-20}$ internal olefin sodium salt); 0.14% by weight of a sulfonate surfactant represented by the formula

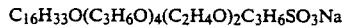

$$C_{16}H_{33}O(C_3H_6O)_4(C_2H_4O)_2C_3H_6SO_3Na$$

0.14% by weight scleroglucan polymer having an intrinsic viscosity of 190 dl/g; 0.02% by weight polyvinylpyrrolidone K-30 (product of Fluka Chemical identified as polyvinylpyrrolidone having a molecular weight of 40,000); and 0.05% by weight formaldehyde. IFT and solubilization parameters are measured using the above-indicated procedures with the results being as follows: IFT=0.005 dyne/cm; Vo/Vs=29.4; and Vw/Vs=24.0.

EXAMPLE 2

The procedure of Example 1 is repeated with the exception that distilled water is used in place of seawater to make the aqueous system containing the surfactants, polymers and formaldehyde.

EXAMPLE 3

The aqueous system of Example 1 is freeze-dried with the result being a substantially dry composition having the following formulation:

| | Wt. % |
|---|---|
| Shell Enordet IOS-1720 | 5.22 |
| Sulfonate surfactant | 3.48 |
| Scleroglucan | 3.73 |
| Polyvinylpyrrolidone K-30 | 0.50 |
| Inorganic salts | 74.53 |

-continued

| | Wt. % |
|---|---|
| Water | 12.54 |

The freeze-dried composition is blended with distilled water to form a reconstituted aqueous system, the weight ratio of distilled water to freeze dried material being 24.845:1. The total concentration of surfactant (i.e., Shell Inordet IOS-1720 and Sulfonate surfactant) in this reconstituted aqueous system is 0.35% by weight as determined by two-phase titration. IFT and solubilization parameters are measured using the above-indicated procedures with the results being as follows: IFT=0.006 dyne/cm; Vo/Vs=29.2; Vw/Vs=23.3.

EXAMPLE 4

Viscosity measurements at various shear rates are taken using the aqueous system of Example 1 and the reconstituted aqueous system of Example 3 at 22.5° C., with the result being no viscosity loss for the reconstituted system of Example 3 in comparison to the aqueous system of Example 1.

EXAMPLE 5

The freeze-dried composition of Example 3 is maintained at 15° C. for 130 days, then reconstituted with distilled water to form a 130-day reconstituted aqueous system. The weight ratio of distilled water to freeze dried material is 24.845:1. The total concentration of surfactant (i.e., Shell Enordet IOS-1720 and Sulfonate surfactant) in this reconstituted system is 0.35% by weight as determined by two-phase titration. Viscosity measurements at various shear rates are taken using the aqueous system of Example 1, the reconstituted aqueous system of Example 3, and the 130 day-reconstituted aqueous system of this Example 5 at 22.5° C., with the result being no viscosity loss for the systems of Example 3 or Example 5 when compared to the system of Example 1.

EXAMPLE 6

An aqueous system containing 0.35% by weight NES-30 (product of Diamond Shamrock identified as a linear alkylether sulfonate), 0.128% by weight scleroglucan polymer having an intrinsic viscosity of 190 dl/g, 0.022% by weight Actigum CS-11 (product of Jetco Chemicals identified as a scleroglucan polymer), and 0.05% by weight formaldehyde in seawater is prepared. A sample is tested by measuring its viscosity at various shear rates, the results being reported in Col. A of Table I. Another sample is spray-dried. A portion of this spray-dried sample is immediately reconstituted by the addition of deionized water with mixing for 24 hours to provide a reconstituted aqueous system with concentrations of polymer and surfactant equal to the original aqueous system. Concentrations are determined by standard two-phase titration. This reconstituted system is then tested for viscosity at various shear rates, the results being reported in Col. B of Table I. Another portion of the spray-dried composition is stored for 130 days, then reconstituted by the addition of deionized water with mixing for 24 hours to provide an aqueous system with concentrations of surfactant and polymer equal to the aqueous system. This 130-day reconstituted system is then tested for viscosity at various shear rates, the results being reported in Col. C of Table I. The data in Table I discloses no significant degradation of the viscosity characteristics of the samples reported in Cols. B or C when compared to the sample reported in Col. A.

TABLE I

| Shear Rate (sec$^{-1}$) | Viscosity (cP) | | |
|---|---|---|---|
| | A | B | C |
| 0.0404 | 208 | 210 | 211 |
| 0.0749 | 204 | 206 | 207 |
| 0.1379 | 197 | 198.6 | 199 |
| 0.255 | 184 | 184.6 | 185 |
| 0.471 | 167 | 166.3 | 167 |
| 0.87 | 151 | 149.1 | 150 |
| 1.607 | 120 | 117.5 | 118 |
| 2.97 | 96 | 95.0 | 95.5 |
| 5.49 | 74.5 | 73.8 | 74.0 |
| 10.15 | 56 | 55.0 | 55.5 |
| 18.74 | 45.1 | 42.5 | 43.5 |

EXAMPLE 7

An aqueous system containing 8.26% by weight NES-30, 1.377% by weight Flocan 4800 (product of Pfizer identified as xanthan gum), and 2.8% by weight formaldehyde in seawater is prepared. Part of this aqueous system is spray-dried, then reconstituted with deionized water after 80 days. The surfactant concentration in the reconstituted system is the same as in the original aqueous system as determined by two-phase titration. Viscosity measurements at various shear rates are taken with each system, with the result being no viscosity loss for the reconstituted system when compared to the original aqueous system.

EXAMPLE 8

An aqueous composition is prepared by mixing the following materials at the indicated concentrations with seawater: 0.576% by weight scleroglucan polymer (intrinsic viscosity of 150 dl/g); 0.58% by weight of Shell Enordet IOS-1517 (a product of Shell identified as a sodium salt of a sulfonated $C_{15-17}$ internal olefin); 0.58% by weight of

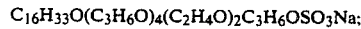
$C_{16}H_{33}O(C_3H_6O)_4(C_2H_4O)_2C_3H_6OSO_3Na$;

2000 ppm formaldehyde; 3000 ppm Na$^+$; and 254 ppm I$^-$. The pH of the system is adjusted to 6.8 using Na$_2$HO$_4$. The aqueous composition is spray-dried in air under the following conditions:

| Air Flow: | 0.8–0.85 m$^3$/min. |
|---|---|
| Inlet Temperature: | 180° C. |
| Outlet Temperature: | 85–87° C. |
| Air Pressure: | 1.2 Kg/cm$^3$ |

The dried product has the following properties:

| Polymer Concentration: | 10.1% by weight |
|---|---|
| Surfactant Concentration: | 19.8% by weight |
| Ion Concentration: | 14.4% by weight |
| Other solids (organic and inorganic): | 44.6% by weight |
| Water: | 11.1% by weight |

The ions referred to above are as follows:

| Ion | ppm |
|---|---|
| Na$^+$ | 60,000 |
| Ca$^{++}$ | 1220 |
| Mg$^{++}$ | 2800 |
| K$^+$ | 4600 |
| I$^-$ | 3640 |
| NO$_3^-$ | 59,200 |
| PO$_4^=$ | 12,980 |

Two days after the dried product is prepared, part of it is reconstituted with water. Surfactant concentration and bulk viscosity measurements indicate no loss of polymer or surfactant.

54 days after the dried product is prepared, part of it is reconstituted with water. Surfactant concentration and bulk viscosity measurements indicate no loss of polymer or surfactant.

EXAMPLE 9

An aqueous composition is prepared by mixing the following materials at the indicated concentrations with seawater: 0.576% by weight scleroglucan polymer (intrinsic viscosity of 150 dl/g); 0.58% by weight of Shell Enordet IOS-1517; 0.58% by weight of

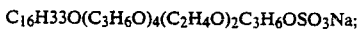
$C_{16}H_{33}O(C_3H_6O)_4(C_2H_4O)_2C_3H_6OSO_3Na$;

2000 ppm formaldehyde; 3000 ppm Na$^+$; and 254 ppm I$^-$. The pH of the system is adjusted to 6.8 using Na$_2$HPO$_4$. The aqueous composition is spray-dried in nitrogen under the following conditions:

| N$_2$ Flow: | 0.8–0.85 m$^3$/min. |
|---|---|
| Inlet Temperature: | 180° C. |
| Outlet Temperature: | 85–86° C. |
| N$_2$ Pressure: | 1.2 Kg/cm$^3$ |

The dried product has the following properties:

| Polymer Concentration: | 10.5% by weight |
|---|---|
| Surfactant Concentration: | 19.1% by weight |
| Ion Concentration: | 14.7% by weight |
| Other solids (organic and inorganic): | 48.4% by weight |
| Water: | 7.3% by weight |

The ions referred to above are as follows:

| Ion | ppm |
|---|---|
| Na$^+$ | 58,000 |
| Ca$^{++}$ | 1140 |
| Mg$^{++}$ | 2600 |
| K$^+$ | 4600 |
| I$^-$ | 3600 |
| NO$_3^-$ | 63,800 |
| PO$_4^=$ | 13,400 |

Two days after the dried product is prepared, part of it is reconstituted with water. Surfactant concentration and bulk viscosity measurements indicate no loss of polymer or surfactant.

54 days after the dried product is prepared, part of it is reconstituted with water. Surfactant concentrations and bulk viscosity measurements indicate no loss of polymer or surfactant.

EXAMPLE 10

An aqueous composition is prepared by mixing the following materials at the indicated concentrations with seawater; 0.512% by weight scleroglucan polymer (intrinsic viscosity of 150 dl/g); 1.5% by weight of Shell Enordet IOS-1517; 1.5% by weight of $$C_{16}H_{33}O(C_3H_6O)_4(C_2H_4O)_4O)_2C_3H_6OSO_3Na;$$

2000 ppm formaldehyde; 5300 ppm $Na^+$; and 294 ppm $I^-$. The pH of the system is adjusted to 6.8 using $Na_2HPO_4$. The aqueous composition is spray-dried in nitrogen under the following conditions:

| | |
|---|---|
| $N_2$ Flow: | 0.8–0.85 m³/min. |
| Inlet Temperature: | 180° C. |
| Outlet Temperature: | 85° C. |
| $N_2$ Pressure: | 1.2 Kg/cm³ |

The died product has the following properties:

| | |
|---|---|
| Polymer Concentration: | 6.4% by weight |
| Surfactant Concentration: | 38.0% by weight |
| Ion Concentration: | 13.0% by weight |
| Other solids (organic and inorganic): | 36.6% by weight |
| Water: | 6.0% by weight |

The ions referred to above are as follows:

| Ion | ppm |
|---|---|
| $Na^+$ | 66,000 |
| $Ca^{++}$ | 960 |
| $Mg^{++}$ | 2000 |
| $K^+$ | 3400 |
| $I^-$ | 3560 |
| $NO_3^-$ | 44,200 |
| $PO_4^=$ | 10,000 |

Two days after the dried product is prepared, part of it is reconstituted with water. Surfactant concentration and bulk viscosity measurements indicate no loss of polymer or surfactant.

54 days after the dried product is prepared, part of it is reconstituted with water. Surfactant concentration and bulk viscosity measurements indicate no loss of polymer or surfactant.

EXAMPLE C-1

An aqueous system containing 0.3% by weight NES-30 and 0.0657% by weight scleroglucan polymer (intrinsic viscosity of 190 dl/g) in seawater is prepared. A sample of the aqueous system is tested by measuring its viscosity at various shear rates. The results are reported in Col. A of Table C-I. A portion of the aqueous system is spray-dried. After drying a sample of the spray-dried composition is then reconstituted, using deionized water, to the same surfactant and polymer concentration, determined by a standard two-phase titration, as in the original aqueous system. This reconstituted aqueous system is tested for viscosity at various shear rates, with the results being reported in Col. B of Table C-I. Another sample of the spray-dried composition is stored for 90 days, then reconstituted using deionized water to the same surfactant and polymer concentration as in the original aqueous system. This 90-day reconstituted system is tested for viscosity at various shear rates, with the results being reported in Col. C of Table C-I. The data in Table C-I indicates that the aqueous system that is made by reconstituting the spray-dried composition after having been stored for 90 days exhibits a substantial degradation of its viscosity characteristics.

TABLE C-I

| Shear Rate (sec⁻¹) | Viscosity (cP) | | |
|---|---|---|---|
| | A | B | C |
| 0.0404 | 390 | 390 | 30 |
| 0.0746 | 370 | 369 | 29.5 |
| 0.1379 | 325 | 324 | 28.5 |
| 0.255 | 268 | 265.2 | 27.5 |
| 0.471 | 209 | 207.9 | 26.3 |
| 0.87 | 159 | 158.1 | 24.1 |
| 1.607 | 113.7 | 110.5 | 19.5 |
| 2.97 | 77.5 | 76.3 | 16.5 |
| 5.49 | 52.3 | 51.4 | 13.5 |
| 10.15 | 34.9 | 34.4 | 10.5 |
| 18.74 | 23.5 | 23.0 | 8.5 |
| 34.6 | 15.9 | 15.5 | 6.6 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for recovering oil from a subterranean formation comprising:
   containing an aqueous concentrate or a dry or substantially dry composition with water to form an aqueous composition, said concentrate or dry or substantially dry composition comprising:
   (A) at least one compound represented by the formula $$RO—(R')_nR''X^-Y^+$$

wherein: R is a hydrocarbyl group of from about 6 to about 24 carbon atoms; R' is ethoxy, propoxy or a mixture thereof; R'' is a divalent hydrocarbyl group of 1 to about 20 carbon atoms; X is a sulfate, sulfonate or carboxylate group; Y is a cation; and n is a number in the range of 1 to about 20;
   (B) at least one polymeric thickener; and
   (C) at least one aldehyde; said aqueous composition comprising from about 0.05% to about 1.2% by weight of component (A), from about 0.02% to about 0.3% by weight of component (B), and from about 0.005% to about 1% by weight of component (C);
   injecting said aqueous composition into said formation and displacing said oil toward one or more production wells.

2. The method of claim 1 wherein said concentrate or dry or substantially dry composition further comprises
   (D) at least one compound represented by the formula $$R^*—D^-E^+$$

wherein R* is a hydrocarbyl group of about 10 to about 28 carbon atoms, D is a sulfate, sulfonate or carboxylate group, and E is a cation.

3. The method of claim 1 wherein said aqueous composition comprises a surfactant slug, said method further comprising the steps of injecting into said formation a buffer slug to follow said surfactant slug, said buffer slug comprising an aqueous solution containing an effective amount of at least one thickener to provide said buffer slug with a viscosity of about equal to or exceeding the viscosity of said surfactant slug, then injecting into said formation an aqueous flooding medium.

4. The method of claim 1 wherein said aqueous composition comprises a surfactant slug, said method further comprising the step of injecting into said formation an aqueous flooding medium.

5. The method of claim 1 wherein the water employed in said aqueous composition is sea water.

6. A method for recovering oil from a subterranean formation comprising injecting an aqueous composition into said formation and displacing said oil toward one or more production wells, said aqueous composition comprising:

(A) from about 0.05% to about 1.2% by weight of at least one compound represented by the formula $$RO\text{---}(R')_nR''X^-Y^+$$

wherein: R is a hydrocarbyl group of from about 6 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20;

(B) from about 0.02% to about 0.3% by weight of at least one polymeric thickener; and (C) from about 0.005% to about 1% by weight of at least one aldehyde.

7. The method of claim 6 wherein said aqueous composition further comprises (D) at least one compound represented by the formula $$R^*\text{---}D^-E^+$$

wherein R* is a hydrocarbyl group of about 10 to about 28 carbon atoms, D is a sulfate, sulfonate or carboxylate group, and E is a cation.

8. The method of claim 6 wherein said aqueous composition comprises a surfactant slug, said method further comprising the steps of injecting into said formation a buffer slug to follow said surfactant slug, said buffer slug comprising an aqueous solution containing an effective amount of at least one thickener to provide said buffer slug with a viscosity of about equal to or exceeding the viscosity of said surfactant slug, then injecting into said formation an aqueous flooding medium.

9. The method of claim 6 wherein said aqueous composition comprises a surfactant slug, said method further comprising the step of injecting into said formation an aqueous flooding medium.

10. The method of claim 6 wherein the water employed in said aqueous composition is sea water.

11. A method for recovering oil from a subterranean formation comprising:

combining a dry or substantially dry composition with water to form an aqueous composition, said dry or substantially dry composition comprising:

(A) at least one compound represented by the formula $$RO\text{---}(R')_nR''X^-Y^-$$

wherein: R is a hydrocarbyl group of from about 6 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20;

(B) at least one polymeric thickener; and (C) at least one aldehyde;

said aqueous composition comprising from about 0.05% to about 1.2% by weight of component (A), from about 0.02% to about 0.3% by weight of component (B), and from about 0.005% to about 1% by weight of component (C);

injecting said aqueous composition into said formation and displacing said oil toward one or more production wells.

12. A method of recovering oil from a subterranean formation comprising:

combining an aqueous concentrate or a dry or substantially dry composition with water to form an aqueous composition, said concentrate or dry or substantially dry composition comprising:

(A) at least one compound represented by the formula $$RO\text{---}(R')_nR''X^-Y^-$$

wherein: R is a hydrocarbyl group of from about 6 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20;

(B) at least one polymeric thickener; and (C) at least one aldehyde;

said aqueous composition comprising from about 0.05% to about 1.2% by weight of component (A), from about 0.02% to about 0.3% by weight of component (B), and from about 0.005% to about 1% by weight of component (C); wherein the weight ratio of component (A) to component (B) is about 1:1 to about 10:1 and the weight ratio of component (A) to component (C) is about 1.5:1 to about 50:1;

injecting said aqueous composition into said formation and displacing said oil toward one or more production wells.

13. A method for recovering oil from a subterranean formation comprising injecting an aqueous composition into said formation and displacing said oil toward one or more production wells, said aqueous composition comprising:

(A) from about 0.05% to about 1.2% by weight of at least one compound represented by the formula $$RO\text{---}(R')_nR''X^-Y^+$$

wherein: R is a hydrocarbyl group of from about 6 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20;

(B) from about 0.02% to about 0.3% by weight of at least one polymeric thickener; and (C) from about 0.005% to about 1% by weight of at least one aldehyde; wherein the weight ratio of component (A) to component (B) is about 1:1 to about 10:1 and the weight ratio of component (A) to component (C) is about 1.5:1 to about 50:1.

14. A method for recovering oil from a subterranean formation comprising injecting an aqueous composition into said formation and displacing said oil toward one or more production wells, said aqueous composition comprising:

(A) from about 0.05% to about 1.2% by weight of at least one compound represented by the formula $$RO-(R')_nR''X^-Y^+$$

wherein: R is a hydrocarbyl group of from about 6 to about 24 carbon atoms; R' is ethoxy, propoxy or a mixture thereof; R'' is a divalent hydrocarbyl group of 1 to about 20 carbon atoms; X is a carboxylate group; Y is a cation; and N is a number in the range of 1 to about 20;

(B) from about 0.02% to about 0.3% by weight of at least one polymeric thickener; and (C) from about 0.005% to about 1% by weight of at least one aldehyde.

* * * * *